(12) United States Patent
Niederer (10) Patent No.: US 7,888,590 B2
(45) Date of Patent: Feb. 15, 2011

(54) SUPPLY UNIT FOR POWER AND WATER BASED ON RENEWABLE ENERGY

(75) Inventor: Robert Niederer, St. Gallen (CH)

(73) Assignee: Pure Soil Holding Inc., Belize (BZ)

( * ) Notice: Subject to any disclaimer, the term of this patent is extended or adjusted under 35 U.S.C. 154(b) by 1207 days.

(21) Appl. No.: 10/552,207

(22) PCT Filed: Apr. 6, 2004

(86) PCT No.: PCT/CH2004/000215

§ 371 (c)(1),
(2), (4) Date: Jun. 26, 2006

(87) PCT Pub. No.: WO2004/090327

PCT Pub. Date: Oct. 21, 2004

(65) Prior Publication Data

US 2006/0260672 A1    Nov. 23, 2006

(30) Foreign Application Priority Data

Apr. 7, 2003 (CH) .................................... 0635/03

(51) Int. Cl.
H02N 6/00 (2006.01)
(52) U.S. Cl. ........................ 136/251; 136/291; 126/606; 126/710
(58) Field of Classification Search ................ 136/251, 136/291; 126/606, 710
See application file for complete search history.

(56) References Cited

U.S. PATENT DOCUMENTS 3,595,216 A * 7/1971 Lanciault .................... 126/606

(Continued)

FOREIGN PATENT DOCUMENTS

AU    704 168 B    4/1999

(Continued)

OTHER PUBLICATIONS

Niederer et al., WO 03/031341 A1 Online Machine Translation, Apr. 17, 2003. Translated from European Patent Office Website on Apr. 6, 2010.*

Primary Examiner—Alexa D Neckel
Assistant Examiner—Golam Mowla
(74) Attorney, Agent, or Firm—Calfee, Halter & Griswold LLP (57) ABSTRACT

The supply unit comprises a box type profile frame (1), whose base rests on wheels (2) and on whose top side (3), a square frame (16), as seen from above, is placed, said frame containing a solar panel (7). This can be swiveled about a horizontal axis (8) and is so connected to one of the top sides of the box type profile frame (1). A peripheral, square frame (5) of same size, each containing a solar panel (6), is connected in a swiveling way to each side of this square frame (16), so that out of the five square frames (16;5), a cube is formed when these frames are swiveled down. The peripherally connected square frames (5) can be swiveled to the plane of the central square frame (16) and can be locked in this position to the central square frame (16). The box type profile frame (1) contains several box type modules (24-26), which can be inserted like drawers from one side and can be arrested in these inserted positions; these modules are for various functions like accumulation of energy from sun and wind, preparation of drinking water, pumping water, delivery of electric power or Direct Current-Hydrogen generation through fuel cells.

3 Claims, 10 Drawing Sheets

U.S. PATENT DOCUMENTS

| | | | | |
|---|---|---|---|---|
| 3,946,721 | A * | 3/1976 | Keyes et al. | 126/620 |
| 3,973,553 | A * | 8/1976 | Lanciault | 126/634 |
| 3,999,389 | A * | 12/1976 | Bryce | 60/641.15 |
| 4,145,021 | A | 3/1979 | Gaechter et al. | |
| 4,200,904 | A * | 4/1980 | Doan | 362/183 |
| 4,209,346 | A * | 6/1980 | King | 136/246 |
| 4,368,692 | A * | 1/1983 | Kita | 122/26 |
| 4,421,943 | A | 12/1983 | Withjack | |
| 5,969,501 | A | 10/1999 | Glidden et al. | |
| 2003/0230333 | A1 * | 12/2003 | Kashyap | 136/243 |

FOREIGN PATENT DOCUMENTS

| | | | |
|---|---|---|---|
| DE | 2730300 A | * | 1/1979 |
| DE | 34 05 466 A | | 8/1985 |
| DE | 3405466 A1 | * | 8/1985 |
| DE | 84 38 377 U | | 11/1985 |
| DE | 4242313 A1 | * | 6/1994 |
| DE | 196 08 330 A | | 9/1997 |
| DE | 299 00 391 U | | 6/1999 |
| FR | 2600118 A | * | 12/1987 |
| JP | 11 210192 A | | 8/1999 |
| WO | WO 94/29802 A | | 9/1994 |
| WO | WO 98/42981 A | | 10/1998 |
| WO | WO 03/008803 | | 1/2003 |
| WO | WO 03/031341 A | | 4/2003 |
| WO | WO 2004/063567 | | 7/2004 |

* cited by examiner

SUPPLY UNIT FOR POWER AND WATER BASED ON RENEWABLE ENERGY

RELATED APPLICATIONS

This application is a national stage application based on and claiming the benefit of the filing date of International Application No. PCT/CH2004/000215, filed Apr. 6, 2004, which claims priority from and the benefit of the filing date of Switzerland application No. 635/03 filed Apr. 7, 2003.

This invention relates to a supply unit for energy and water, with which, a house, a cottage or a construction site can be supplied in a self sufficient manner with electric power and also with adequate drinking water, if need be, from a public or private energy and water utility. Sunlight and wind provide the energy for driving this supply unit and the water is taken either from a nearby stretch of water like lakes, rivers or canals or from ground water.

For everyday consumption and maintenance, approximately 25 KWH is considered as sufficient, for a family, which lives in an apartment or a simple house, i.e., daily electrical energy requirement for operating the usual electrical appliances like vacuum cleaner, cooking pan, shaving equipment, food processor, freezer, refrigerator etc. A house vacuum cleaner has a power consumption of approx. 1000 W and hence 25 KWH is enough to operate the same round the clock, which gives a fairly good idea of the energy requirement, discussed hereinafter. In colder climate zones, the energy requirement is naturally higher than in mild zones and again, in very hot climate zones, the energy requirement is similarly higher when the living space has to be cooled; in hotter climate zones, however, the sun shines more strongly and, as a rule, for longer period. On the contrary, the wind often blows consistently, which can be utilized as dispenser of energy. In many instances, the sun- and wind energies thus complement each other.

An overview of power consumption for some typical equipment is given below, as these are operated customarily in a single- or multi person household. The consumption of each equipment or equipment type for a household, inhabited by 1, 2, 3 and 4 persons, is given, the household being situated in the climate zone of central Europe. Source: Household power consumption 1997, Association of Electrical Industries (VDEW), Stresemannallee 23, D-60596 Frankfurt am Main.

It is therefore understood that to meet all needs of a 4-head family, an average amount of energy of 20.18 kWH per day should suffice. The supply of water is not considered here. The pumping up of and providing for water, however, requires comparatively less additional energy.

Although the supply of energy in industrialized nations, and in countries, which are at the stage of economic take off, take place from central power plants these days, this is not the case yet with many developing countries. A major portion of the population has to wait for a power connection and would have been delighted to have it and change their lives for the better. A lot of work would have been made simpler for the population with a supply of energy and water and also, thanks to an adequate supply of water, their hygiene and health condition would have improved drastically. The water is often available in wells or in water spots at some distance but making it available, however, is troublesome. Water often has to be pumped by hand from a well or has to be obtained from a water source and carried over long distances to the dwelling places. Moreover, the quality of this water is often not pure and is even alarming. Not only in poor or underdeveloped countries generally, but also in remote settlement areas, in hilly- and desert areas, natural parks, in holiday areas or on beaches, there is a shortage of power and water. There can also be temporary, local needs for electric power and water, not only in developing or about-to-be developed countries but also in industrial countries, caused by natural events, accidents, natural catastrophes or even war like situations when the public power supply has failed and the associated infrastructure has also been destroyed. Till now, one has fallen back on emergency power supply units, which are driven by a diesel engine. In some countries, where the public electric power supply is less reliable, such units are found in many houses and commercial establishments, to be available in case of emergency, or electrical power is even produced permanently through such units. One should think of fast growing cities in certain countries, where the exhaust pipes open directly into the streets and spread smoke and stench all round.

Therefore, there is a need for finding a supply unit for electric power and water, which works noiselessly, reliably, maintenance free, odour free and efficiently, and can be operated by renewable energies. Such a supply unit also must be compact, light and mobile so that it can be transported, without much problem, by land, by water and by air to any desired place of use. This supply unit must be simple to operate and, according to the actual demand, should be quickly adaptable to the local need. It should be able to meet the demand for electric power as well as drinking water, as long as water in the surrounding area is available in the form of ground water or a stretch of standing or flowing water. It must also be able to purify the water to the quality of potable water. Finally, one should be able to manufacture it economically so that it can be used by a large number of people in places, where they live permanently or make a temporary stopover and where no power is otherwise available, the unit being so cost effective to procure and operate that people can afford it.

It is therefore an objective of the present invention to create a supply unit for electric power and water derived from renewable energies, which satisfies the above criteria and meets the electric power and water requirements of an average 4-head family and, to this end, can provide for an average daily amount of energy of at least 25 KWH, out of which a part is set aside for pumping water and its purification to potable.

This objective is met through a supply unit for electric power and/or water derived from renewable energies, which is distinguished by the features that it comprises a box type profile frame, wherein the box sides build foldable solar panels in the plane of the top side of the box and the cross shaped solar panel arrangement, so configured, can be tilted about a horizontal axis on the profile frame.

An embodiment of a supply unit according to the invention is shown in different representations in the drawings. The construction, the individual components and the functioning of the supply unit for electric power and water are described later with the help of these drawings.

It is shown in.

Figure 1:
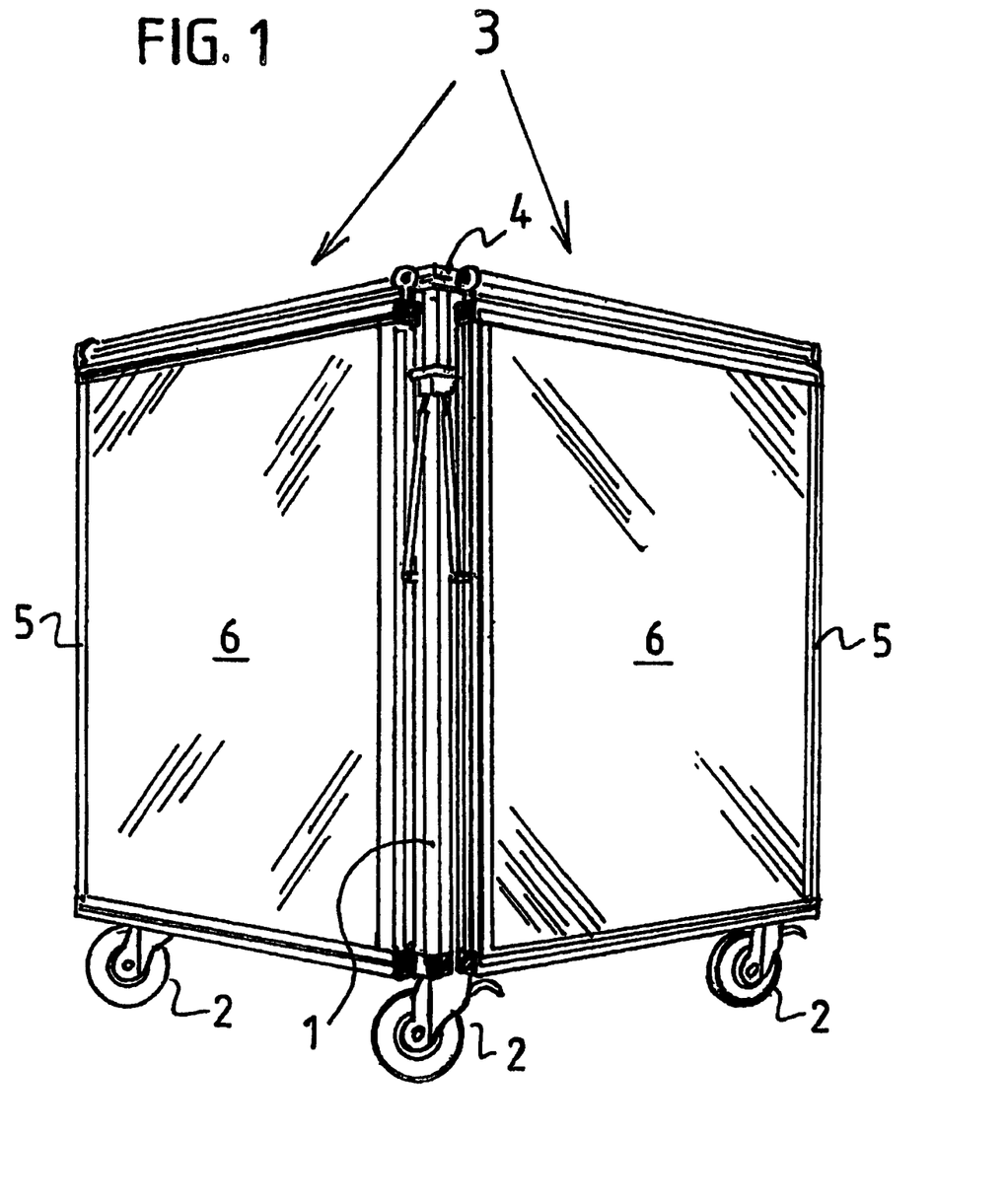
FIG. 1: The supply unit in a state for transportation.

The supply unit is shown in FIG. 1 in non-operating condition or in the condition of transport. It is made up of a box type profile frame 1, which is made from a commercial grade aluminium profile, which has a square cross section and has a T-shaped spline with corresponding undercut on each of its length side. This box type profile frame 1 has identical length and width, while its height is somewhat smaller, for example, between $2/3^{rd}$ or $4/5^{th}$ of the length and width, which is made clearer through another Figure. The box type profile frame 1 stands on wheels 2, which are four freely steerable wheels 2 in the shown example and are mounted at the bottom corners of profile frame 1. The whole supply unit becomes easily portable in this way and it can be rolled in all directions, which allows easy loading and unloading in a truck, loading in a container or moving about at a place. Two adjacent wheels 2 can be blocked around their vertical swivel axis, so that they take the same rolling direction, which extends along the length of a frame side. The supply unit can then be pulled or pushed with rope by several persons or by a vehicle and it can also be then well steered. At the top side 3 of the box type profile frame 1 lies one box type profile frame 4, which has an identical outline as the former and contains a solar panel in its square upper side 3 which solar panel is not shown in this illustration. This segregated box type 4 has a height of approximately one-fifth to one-third of the length and width of the box type profile frame 1, which means a height of about 20 cm to 35 cm and it lies congruent upon the lower profile frame 1. One of its bottom sides is coupled in a swivelling manner with one of the upper sides of the cuboid shaped profile frame 1, so that the upper profile frame 4 can swivel around this axis together with the solar panel, which has been accommodated on its top side. A peripherally square profile frame 5 is connected in a swivelling manner at each of the four upper longitudinal edges of this profile frame 4, wherein each of these profile frame 5 takes in a solar panel 6. When all these peripheral profile frame 5, together with the solar panels 6 are swivelled down, as shown here, a cube is formed, whose width, length and height are the same. Ideally, this cube should have a side length of 1 m, which is most advantageous for transportation in a container, whether it is by truck, ship or aircraft, as the available space as per the international norm is then best utilized. At the same time, a cube of such dimensions can be moved straightaway by two persons, without a lifting tackle or vehicle being necessary for every movement.

Figure 2:
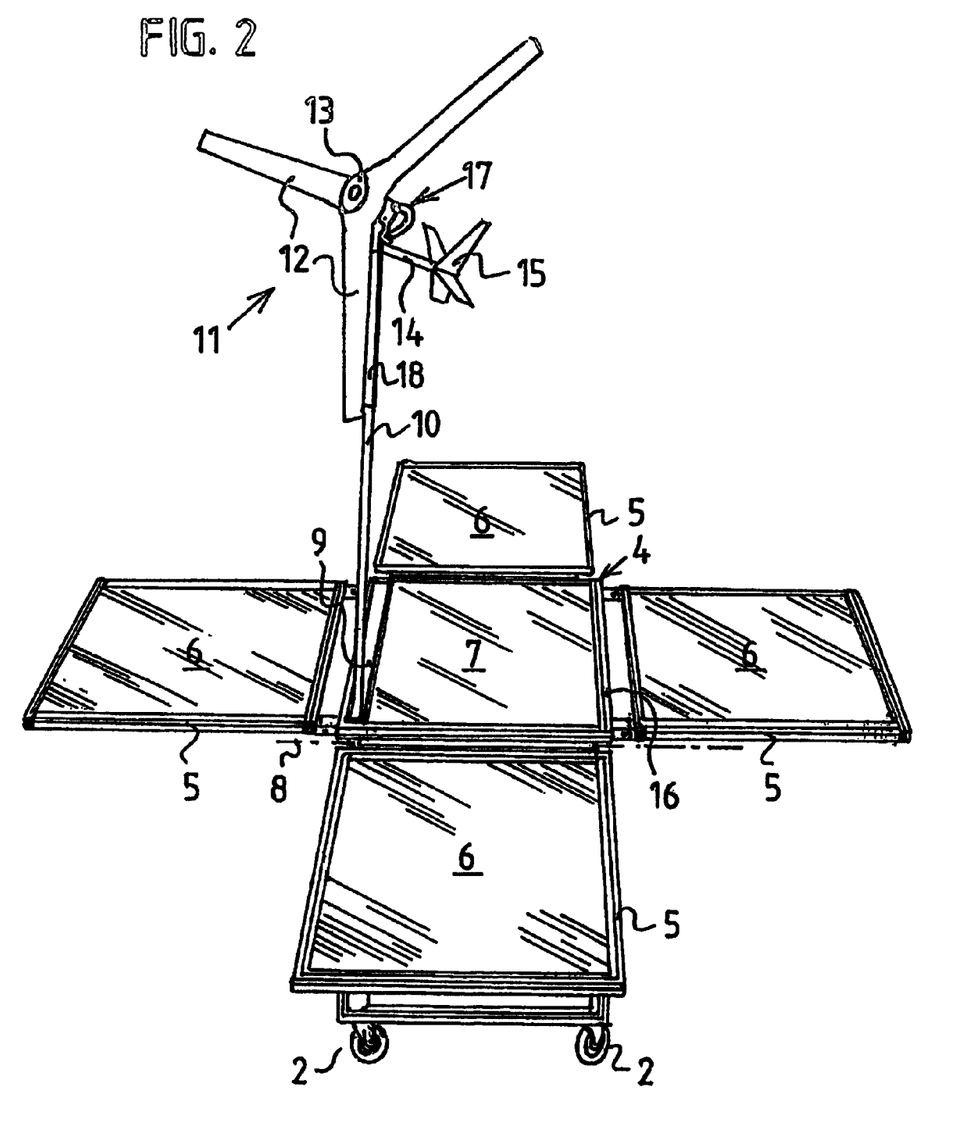
FIG. 2: The supply unit in operating condition with open solar panels and the mounted wind mill.

FIG. 2 shows the supply unit with folded open solar panels 6 and the central solar panel 7, which has been swung up, as the unit looks in operation. In this illustration, the central solar panel is now visible, which is enclosed by the square profile frame 16, which again makes up the upper side of the top box type profile frame 4. From the starting position, as shown in FIG. 1, the four square profile frames 5, which are connected at the upper side of the top profile frame 4, would have swung up first with the enclosed solar panels 6 to a plane, in which the upper side of the top profile frame 4 with the solar panel 7, as enclosed by it, lies. In this way, a cross of solar panels 6, 7 is formed. The upper profile frame 4 is later tilted towards the front about a horizontal axis 8, which is shown here in dashed line, or its side, which is away from the observer, is lifted up to certain extent so that this upper profile frame 4 and specially the solar panel 7, which is contained in the square profile frame 16, which is formed on the top side of profile frame 4, is tilted by about 30 degrees from the horizontal. In similar fashion, all the other solar panels 6, which are connected to the square profile frame 16, also take up then the same amount of tilt automatically. This tilt can be changed from 0 degrees to about 60 degrees and can be locked in each set position. The horizontal axis 8 extends along the length of the upper outer edge of the bottom profile frame 1 and the lower outer edge of the adjacent top profile frame 4. The solar panel 7 does not fill up completely on one side the frame of the upper side of the top profile frame 4 and a slit 9 is formed there, which runs perpendicularly to the swivelling axis 8. This slit 9 accommodates the pole 10 of a windmill 11. In the starting position, as shown in FIG. 1, this pole 10 is lodged totally inside the cube shaped supply unit. The pole 10 can be either telescopic or one of several segments fitted together or one with hinged elements. The pole 10 is designed in such a way that it can be set at different heights, wherein either the telescope can be locked at different pulled heights or the pole can be held at the desired height with tubular clamps or it can be pulled out to different heights through mechanical opening of its joints. For a pole, which is built up of several jointed segments, these joints can be opened by a crank drive, where, for example, a screw drive can be provided on the joints, whose screw (worm) can be turned from the crank through a string. At the tip of the pole, which is at a height of maximum about 3 m, a windmill 11 is mounted, which comprises here three blades 12, which, with their roots, can be screwed on the central hub 13 of a generator 17 for the windmill 11. The blade 12 of the windmill 11 has a length of somewhat less than 1 m, so that this can be stowed away in the inside of the cube along its length for transportation. The generator 17 is mounted on the upper end of a pipe segment 18 of approximately 0.60 m to 0.80 m length, which is clinched on the pole 10, in such a way that it can rotate around the pipe axis. Its driving axis runs at right angle to this pipe segment 18. At the rear side of the generator 17 extends a carrier rod 14 by about half meter to the back. A wind tail unit 15 is mounted at its end. It is built in such a compact fashion that for transportation, it can be lodged in the inside of the cube, as is presented in FIG. 1.

Figure 3:
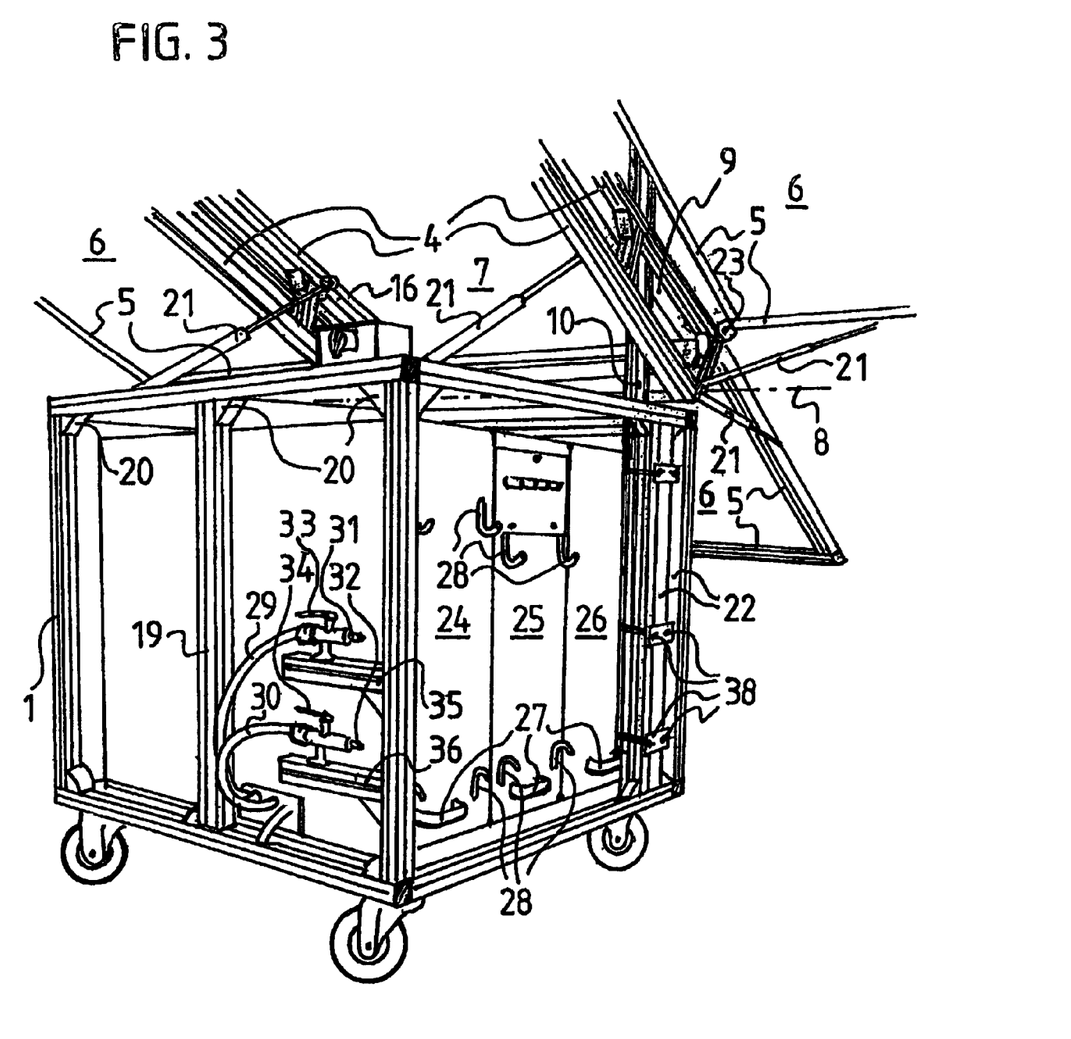
FIG. 3: The lower part of box type profile frame of the supply unit with open solar panels, with the hinge on the rear side of the picture and part of the open solar panel removed.

FIG. 3, shows the rear side view of the supply unit is with the opened/swivelled up solar panels. The box type profile frame 1 is made of aluminium or stainless steel profiles with a T-slot put in on each length side. This box type profile frame 1 has an identical length and width, whereas its height is about $4/5^{th}$ of these dimensions in the shown example. For the purpose of strengthening, a vertical middle post 19 is provided for the top box type frame 4 on the side of the horizontal swivelling axis 8 as well as on the opposite side. On account of the profile system with T-slots, all the corners of the profile frame 1 and profile frame 4 are built through screwing. No welding is thus necessary to assemble the frames 1, 4. The torsional stability of the box type frames 1, 4 is realized through corner braces 20, which are likewise screwed on the profiles. It can be seen from this illustration that the swivelled up portion on top of profile frame 1, builds another box type profile frame 4 on its part, wherein the four profiles, which form its upper side, again form a square profile frame 16, which frames and encloses the central solar panel 7. Along the length of this rear, top horizontal profile of the box type profile frame 1, extends the horizontal axis 8, about which the top profile frame 4 can be swivelled up. Two gas springs 21 are placed between the lower box type frame 1 and the upper box type frame 4 so that this high swivelling becomes lighter. On one side, these are connected with the profiles, which run perpendicularly to the horizontal axis and even on that side, which is away from the hinge, made by the horizontal axis 8, and from there it leads up in a slanted way to the top profile frame 16 of the upper box type profile frame 4, where they are connected closer to the hinge. These gas springs 21 develop such a force that the swivelling up of the top box type profile frame 4, together with the peripheral solar panels 6, which are connected with the same, proceed lightly. In similar fashion as the gas springs 21, adjusting supports can be connected to the frames 1,4, wherein one end of them has a longitudinal slit, through which a screw passes and about this the support can be swivelled as well as shifted. By pulling the screw tight, the support can be made rigid in any desired adjusting position and can be locked in its length, so that every desired swivel position of the upper box type profile frame 4 can be locked. In the rear right hand corner of the profile frame 1 in the picture, the pole 10 can be recognized. This extends along the length of two profiles 22, which are specially arranged for stabilizing the pole, said profiles running vertically with little space between them in the box type profile frame 1. A kennel like profile runs on its side, which faces the inner side of the box and the pole rests on that. The pole 10 is pulled against the kennel like profile by means of three U-shaped tension rods, whose ends run through the profiles 22, said U-shaped tension rods being pulled by the threads 38 against the profiles 22. The pole 10 extends above through a slit 9, which runs between the solar panel 7 and the profile 16 there and the solar panel 7 does not fill up the square profile 16 completely on this side. Through this slit, the pole moves up either telescopically or as parts fitted together or can be opened up by a crank drive, depending on its construction. The peripheral, square profile frame 5 is coupled by at least two hinges 23, which on their part are put in on the upper profile 16 of the square profile frames 4 for the central solar panel 7. These square profile frames 5 are propped up by gas springs 21 at the bottom corners of the upper box type profile frame 4 so that the swivelling up of the peripheral square profile frames 5 together with solar panels 6, whom they enclose, proceed lightly. The peripheral square profile frames 5 with the solar panels 6 are swivelled up at the plane of the solar panel 7 and are held securely in this swivelled position by locking pins, props or braces.

At the inside of the lower box type frame 1, three box type modules 24, 25, 26, which are arranged adjacent to each other inside the frame, can be identified. These modules 24-26 are made of a profile frame at their inside and are closed with plates at the outside. In the embodiment shown, these plates are made of plastic and the box, so constructed, is open at the top and can be closed by an additional cover. The base of the box is perforated so that, if any water enters or the condensation can flow out. The frames of the modules 24-26 can obviously be closed with sheet metal but plastic is more suitable because it is corrosion proof and acid resistant. Each box type module 24-26 is fitted at both ends with a handgrip 27, by which it can be pulled out like a drawer from inside of the box type profile frame 1. Moreover, each module 24-26 lies on one or more insertion rails. As shown in the fully inserted position, the modules 24-26 can be secured. On their front side, which are visible here, as well as on their back side, which are not visible, the modules are further fitted with hooks. Ropes or belts from a lifting tackle can be fastened on them, so that, when an individual module has been pulled out from the frame 1 over the insertion rails, it can be held by a crane and moved out. These modules 24-26 contain various components for the operation of the supply unit, but these components are not visible in the shown example. At the front, on the side facing the viewer, two hoses 29, 30 can be identified with couplings 31, 32, which are again fitted with a stop cock 33, 34 each. These couplings 31, 32 are built on the profile segments 35, 36, which are screwed on a vertical profile of the box type profile frame 1. The hoses 29, 30 lead up to the inside of the module 24, in which the facility for treatment of water is accommodated, which is described by more illustrations hereinafter. In module 25, the batteries and the electronic control for controlling the entire supply unit are well kept and protected. Through the solar panels 6, 7, sunlight is converted photovoltaically to electrical direct current and is fed into the batteries. The direct current is then transformed to 110 V or 220 V alternating current by an inverter for consumption. Further, the windmill can also generate electrical alternating current, which, after rectification is similarly fed into the batteries. During the day, when the sun shines, solar electricity predominates. At night, however, when there is no sunlight, the electrical current is generated exclusively by the windmill as the wind then prevails. During the day, the solar panels and the windmill can complement each other depending on the weather condition, that is, how the sun shines or the wind blows. The producible energy is thus subjected to a 24 hour variation, on one hand due to change of day and night and on the other, due to variation in weather, which affects the availability of sunlight or wind. Such inconsistent pattern of the producible energy must therefore be evened out over a period of time. On the other side, it is the energy requirement, which is variable during a 24-hour day. The energy need is less during the night, and during the day it depends on the momentary activity of the inhabitant or the user of the supply unit. All these fluctuations have to be absorbed by the batteries, which act as an energy storage device. They are constantly recharged by the different amounts of electrical energy, which are straightaway cumulatively generated by the solar panels and the windmill and they deliver the amount of energy, which is required at that point of time, in a definite band of energy per unit of time. It is, however, so designed that the batteries never get totally discharged during normal household operation.

Figure 4:
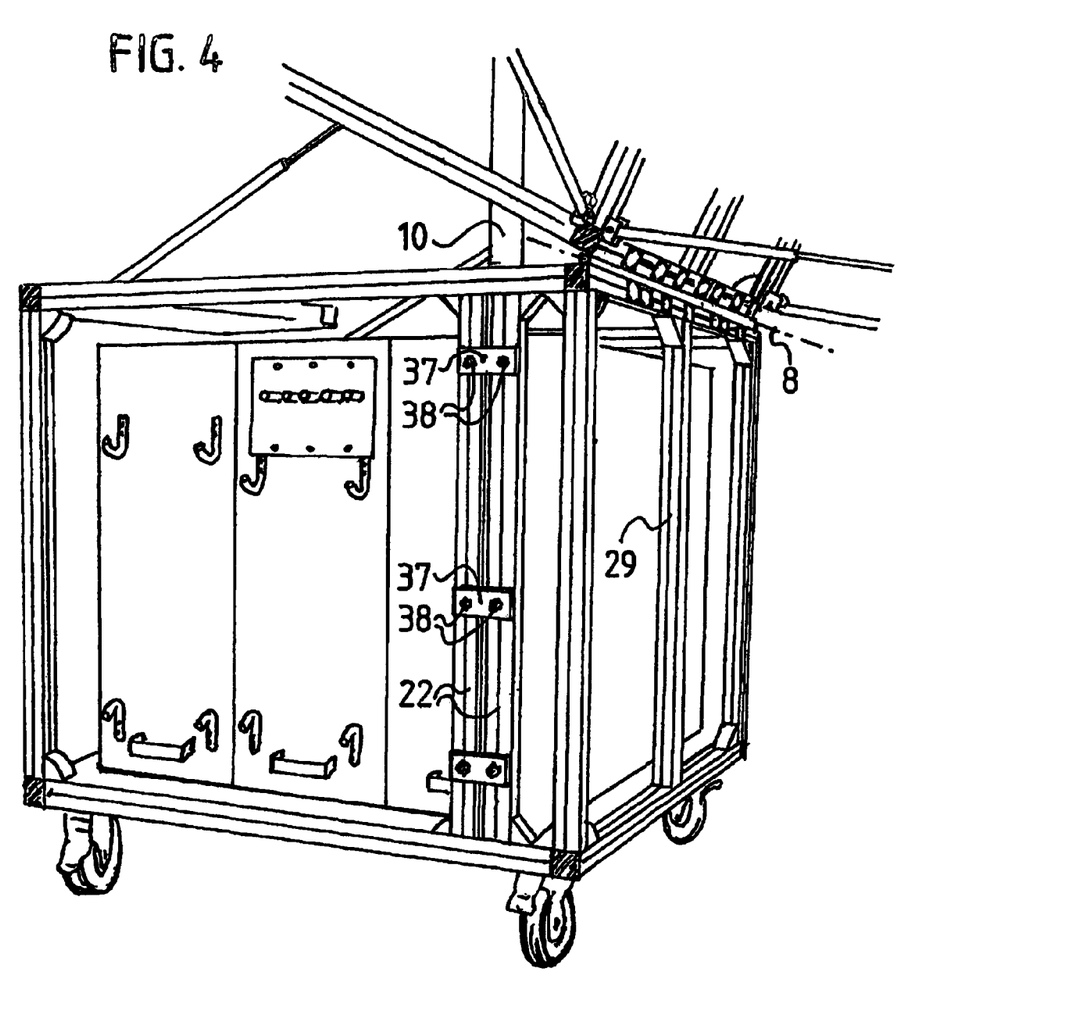
FIG. 4: The lower part of the box type profile frame of the supply unit with the upper box type profile frame slightly swivelled up and the open solar panels thereupon, with the hinge on the right side of picture and the open solar panels removed.

FIG. 4 shows the supply unit when the solar panels are opened, with the hinge now on the right side of the illustration. The hinge 8 or the horizontal axis 8, about which the upper box type profile frame 4 can be swivelled up against the lower profile frame 1, can be easily ascertained. Further identified can be the middle post 29, built on this side of the supply unit, and the two vertical profiles 22, which, with little gap between them, hold the pole 10 on their back side and the pole resting on a kennel shaped profile, which is fastened to the two vertical profiles 22. By means of U-shaped tension rods, whose threaded ends pass through the profiles 22 and also the flats 37, which are shown here, the pole 10 is held in tension with the nuts 38. In case of a jointed pole, it comprises several segments, which are connected with each other through an articulated hinge so that the segments can be folded together by 180 degrees. In folded condition, the segments then lie one over the other, sidewise on the floor of the profile box 1. Through a screw drive, the articulated hinges respectively can be swivelled up and can be held secure in every swivel position. The screws (worms) can be driven through a string respectively, which, on its part, is activated by a respective crank.

Figure 5:
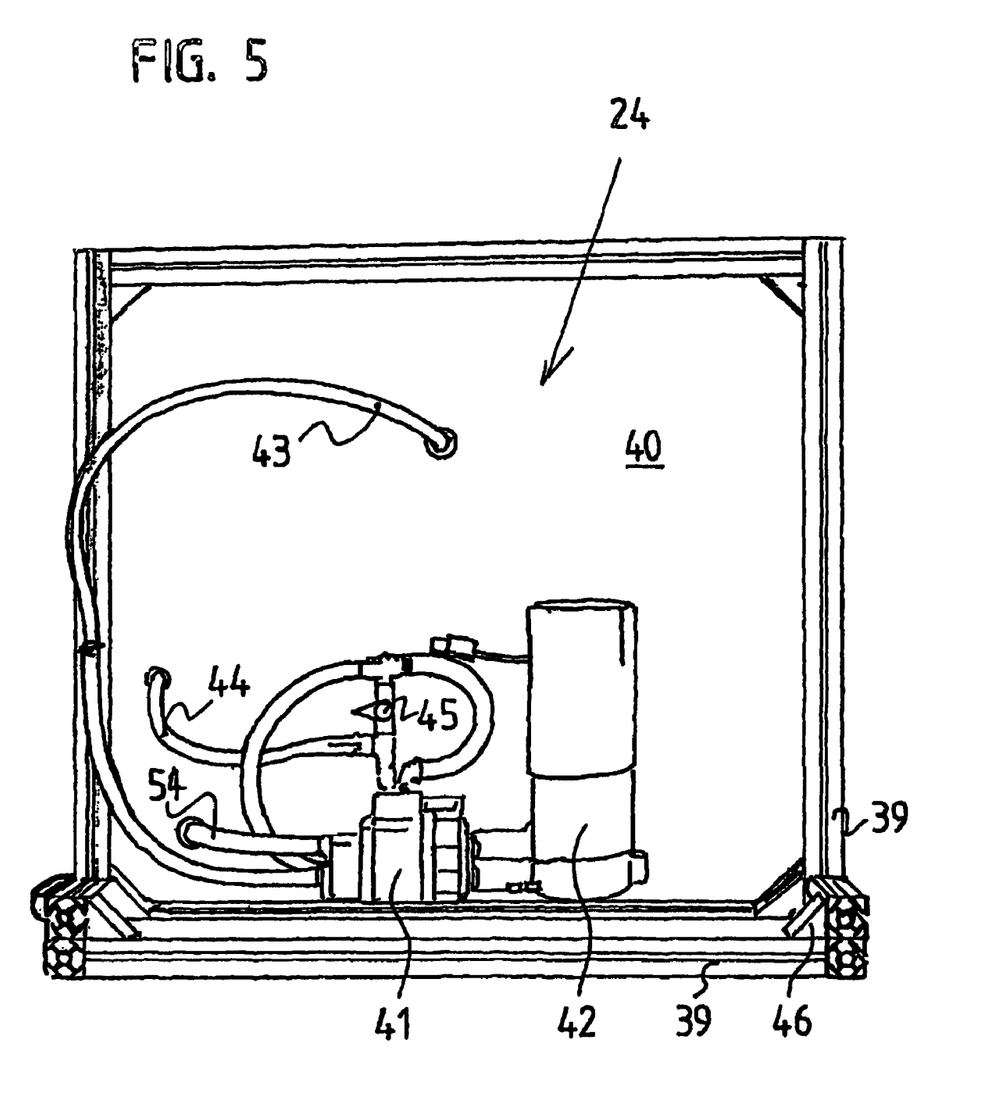
FIG. 5: A view on the inside of the module for water supply with the electric water pump, as seen from one side.

FIG. 5 gives a view of the inside of the module 24 with the electric water pump 41, as seen from the side. For better understanding, the box type module 24 is open on one side. In module 24, a central inner wall 40 is seen, which divides the module in two halves. Each box type module in this way is made of a profile frame of the similar aluminium- or stainless steel profiles 39 as the box type profile frame 1 and 4, which has a T-slot along each side. The pump 41 is built on the wall 40 and, by its side, the electric motor 42 with power cable 43 for driving the pump 41 can be seen. This pump 41 generates a pressure of 820 psi and sucks water from a nearby water source, for example a fountain, a stream or a standing stretch of water via hose 54 through a pre-filtering device, which is built on the back side of the wall 40. It then hauls the water at high pressure of 820 psi through the high pressure hose to another filtering device, which is similarly built on the on the back side of the wall 40. The high pressure hose 44 returns from here again to the pump 41 and a cycle is formed, in which the this high pressure of 820 psi is always maintained. The valve 45 serves towards evacuation of the whole system.

Figure 6:
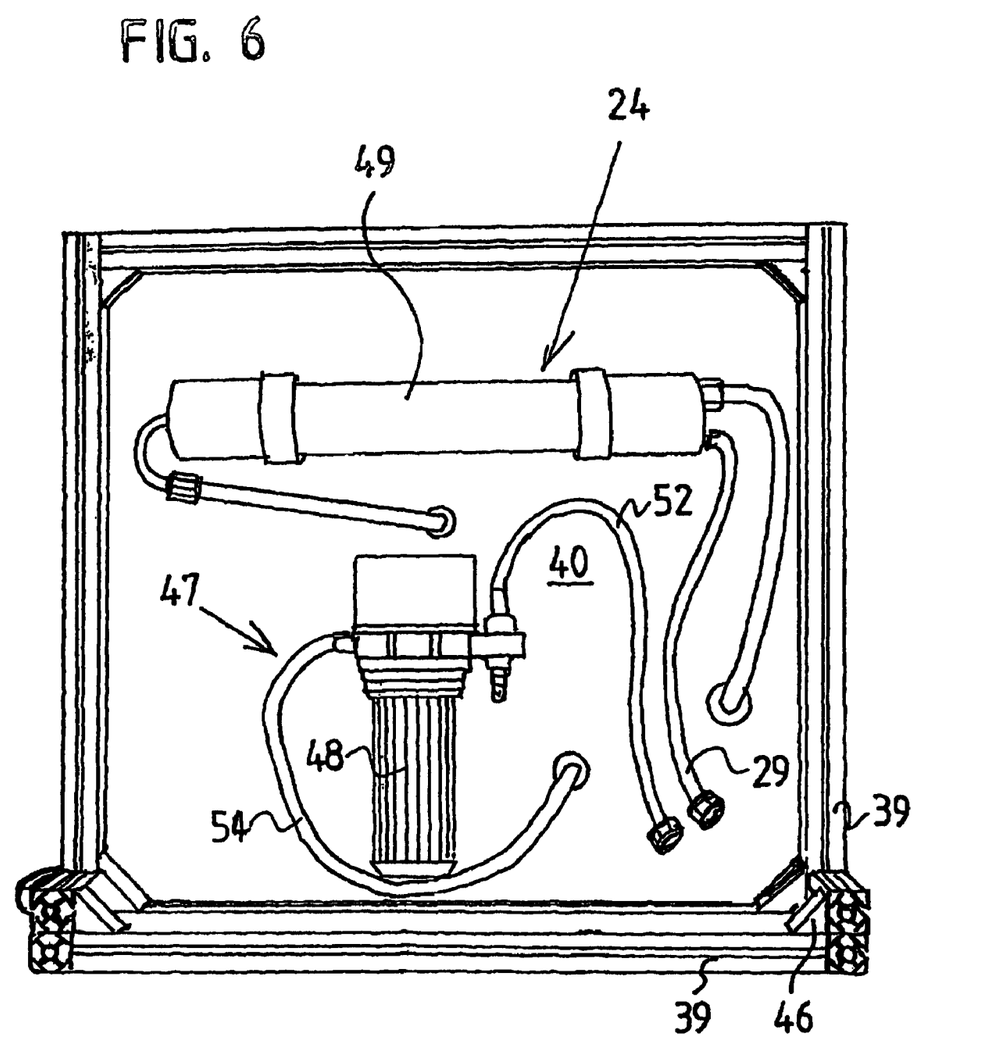
FIG. 6: A view on the inside of the module for water supply with the filtering arrangement, as seen from the other side.

As seen from the other side of the box type module 24, FIG. 6 gives a view on the back side of the partition wall 40. Here, the pre-filtering device 47 with a filter cartridge 48, which is made of paper or a textile fleece-substance, is built and a commercial grade micro filter device 49 above that. This contains a ceramic membrane with pore size of 0.2 $m^{-6}$. Water sucked by the pump 41 reaches via hose 54 first through the pre-filter 47 and later again back to the pump via hose 52, which is shown in FIG. 5. At a high pressure of 820 psi, it is hauled from the pump 41 via the high pressure hose to the ceramic filter 49. After the ceramic filter 49, a part of water reaches via the high pressure hose to the pump 41, so that a high pressure cycle is formed, in which this pressure of 820 is maintained. The other part of water is conducted via hose 29 to a spigot, from which the process water can be received.

Figure 7:
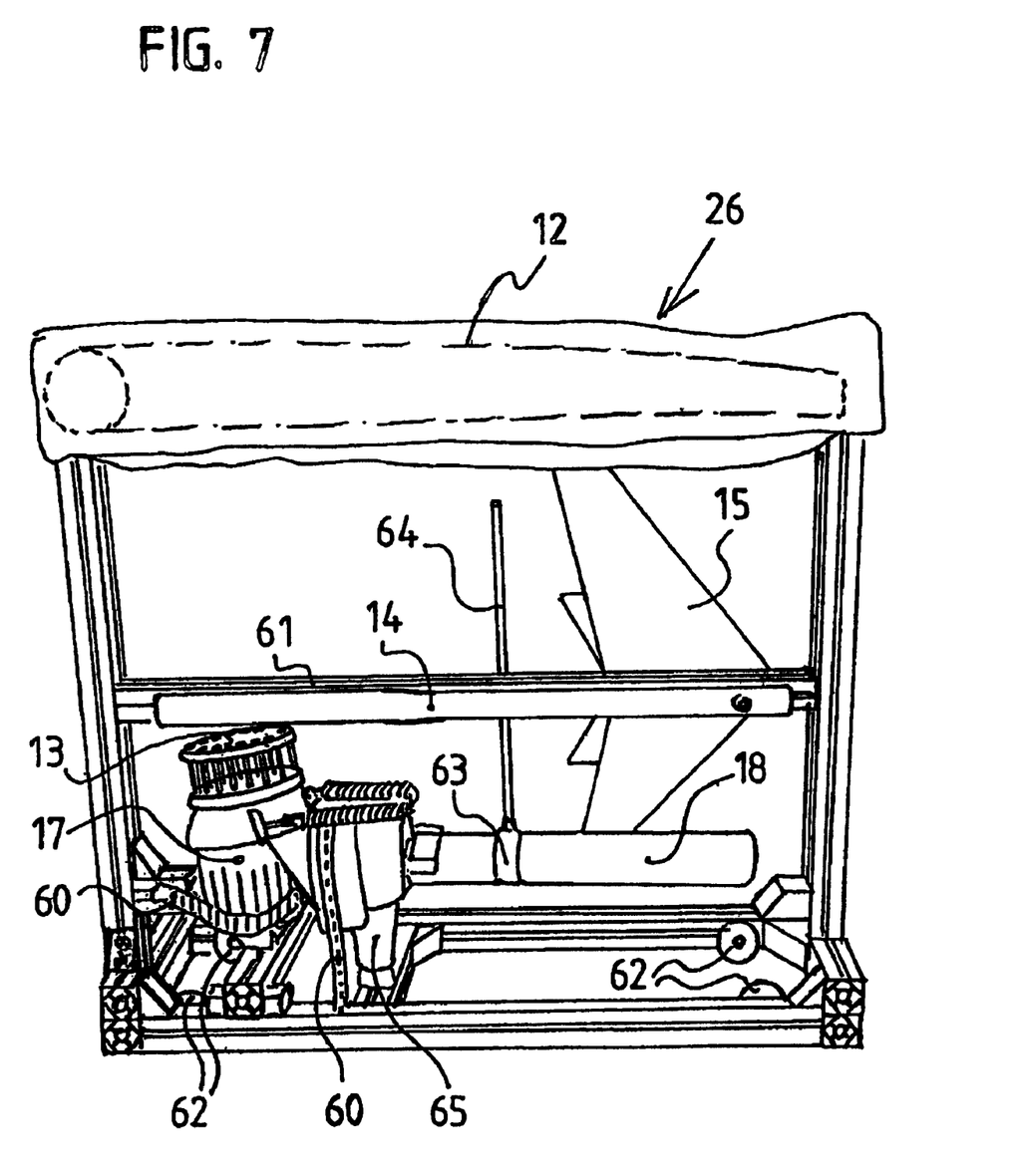
FIG. 7: The push-in type module with the generator, which is driven by the windmill, with the carrier rod for that and the wind tail unit, and also the folded in blades of the wind mill in a state for transportation.

FIG. 7 gives a view of the inside of the box type module 26. It contains in non-operating condition the generator 17 with its driving hub 13 and the pipe segment 18 and also a socket 65 for taking in the carrier rod 14 for the wind tail unit 15. These elements form an assembly unit, which sits in its own holder, in which it is held tightly by metal bands 60 and is secured against sliding. The pipe segment 18 is connected to a strengthening profile 61 by a pipe clamp 63 and a rod 64, the carrier rod 14 for the wind tail unit 15 being threaded firmly on the profile 61. The wind tail unit 15 is threaded firmly on the other side of the strengthening profile 61. At the top side of the module, the windmill blades 12 are accommodated, said blades being packed here and hence not visible. One can also recognize that the lower profiles of the module are fitted with rollers 62 and this makes the movement of the module inside the box type profile frame 1 considerably lighter.

Figure 8:
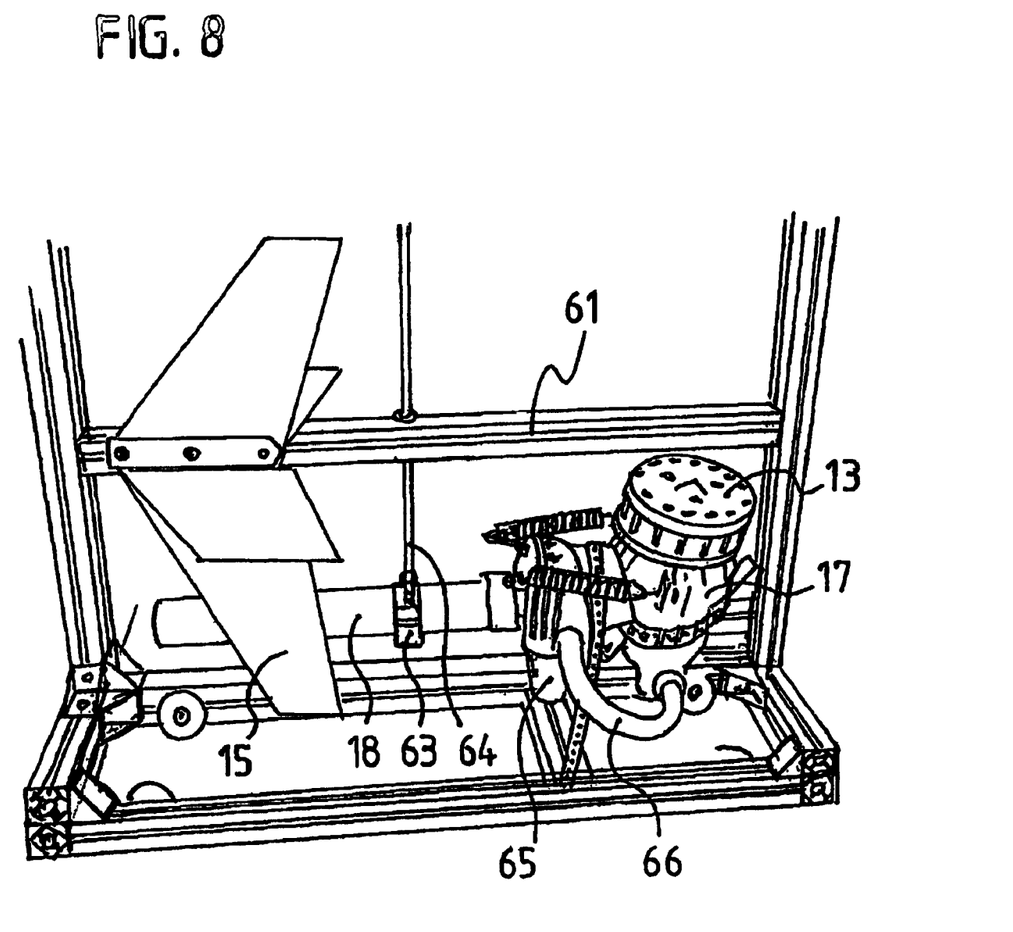
FIG. 8: The push-in type module with the generator, which is driven by the windmill, the side control unit, carrier rod and windmill blades, as seen from the opposite side.

In FIG. 8, one sees the same as in FIG. 7 but from the other side. The wind tail unit 15 is fastened with a screw to the strengthening profile 61 and is made up of four star shaped, protruding blades. In the assembled condition, these blades take care of the orientation of the windmill against the wind and also a good stabilizing of the windmill in the general air stream. The electric cable 66 can also be seen, which leads from the generator 17 to the socket 65, from which the electric current can be taken through a socket, which is not visible and is on the bottom side.

Figure 9:
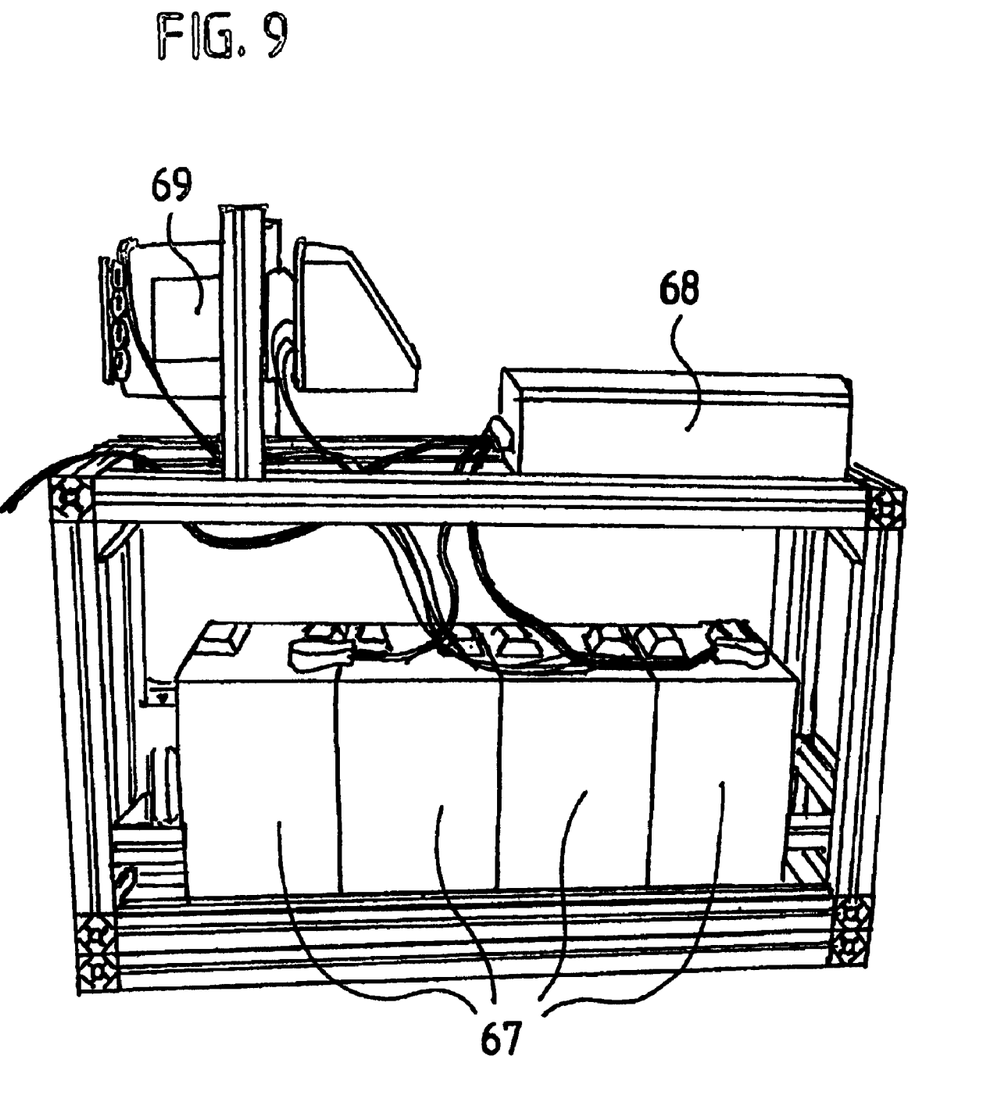
FIG. 9: The push-in type module with the batteries.

FIG. 9 shows the box type module 25 with the batteries 67. Four lead batteries are shown here. These serve as buffering for the energy produced to even out the generation peaks as well as the fluctuating consumption. The profile frame for this module 25 at the middle is somewhat less high and the inverter rectifier unit 68 is built on the frame at the top, this unit working to convert the direct current from the battery to alternating current of voltage 110 or 220 V and also to rectify the generator current for feeding to the batteries. Further, the electronic control 69 for the entire supply unit is accommodated in this module 25, which undertakes the total energy management between solar panels, generator, batteries and electric pump. For all the essential components of the equipment, which means for the solar panels, the batteries, the inverter/rectifier and also for the pump, the filter- and reverse osmosis device and also for the windmill generator, only the proven, standard components are considered.

The use of batteries can be totally dispensed with in an alternative version and the storage of electrical energy, which is generated through solar and through wind forces, can take place with hydrogen. For this purpose, a hydrogen generator is built in the same module, which otherwise would carry the batteries; this hydrogen generator produces hydrogen and oxygen through electrolysis of water by means of the generated direct current and the hydrogen and oxygen can then be burnt again by a similarly built fuel cell.

The importance of coupling together and integration of these components lies in the fact that the supply unit is extremely compact. The wind and solar energy ideally complementing each other, getting stored and being ready for use for average consumption of at least one 4-head family and the modular construction of the individual components, the unit is quickly adaptable to special needs. The individual modules 24, 25, 26 act as interfaces such that the supply unit offers a choice of the following possibilities, depending on the need:

Accumulation of electrical energy from sunlight, and/or

Accumulation of electrical energy from a separate wind generator and/or

Pumping water from standing, flowing stretch of water or ground water

Treatment of drinking water through purification of given dirty water and/or

Delivery of electrical power for different consumers

Direct current generation with hydrogen by means of fuel cells and vice versa hydrogen/oxygen production by splitting water with Direct Current.

It is then possible, for example, that the entire water supply unit, which means the module 24 together with its components is exchanged for another box with batteries, when no supply of water is needed but some extra electrical energy. The water supply unit in module 24 can also be replaced with another box 26 with windmill and generator, so that two windmills are then deployed, when the supply unit is installed at a place with regular and strong wind and where provision for water is not necessary. The capacity for electrical power generation is thereby increased correspondingly. The supply unit can also be made more powerful through use of more components like inserting a micro-hydrogenerator, which is a small turbine with generator, which is placed in flowing water and can contribute a further about 500 W. With the standard equipment, that is, with five solar panels measuring one square meter each, producing about 650 W power in all and with a windmill, having a diameter of approximately two meters, producing up to approximately 750 W, 25 KWH of electrical energy on average can be daily produced. In a typical use situation, as electrical power generator as well as water supply unit, the capacity amounts to about 17.5 KWH of electrical energy in a 24 hour cycle for free use and also providing approximately 500 liters of potable water in this 24 hour cycle.

On the other hand, in places with strong and consistent sunshine but with less wind and where water is of paramount importance, the module for wind energy can be replaced by a water treatment module, so that potable water is made available in the first place with the full capacity of the solar panels and correspondingly less electrical energy for other purposes, since that is of less significance in such regions. This supply unit can thus be made quickly adaptable for specific requirements. For short term, modules or boxes with the suitable components can be exchanged, quickly connected and be brought in operation.

Figure 10:
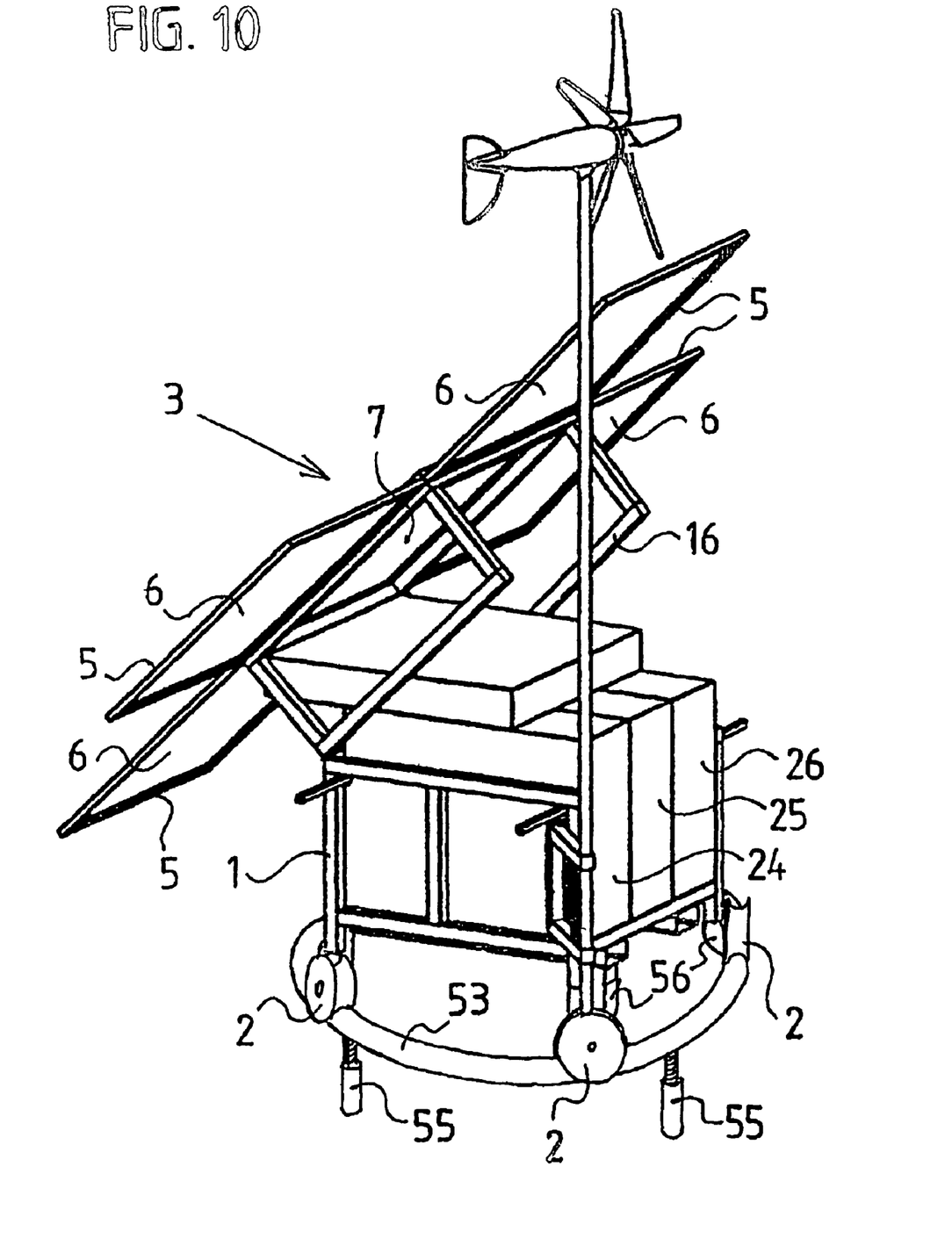
FIG. 10: The supply unit on a tubular ring on casters for swivelling about its normal axis.

In a special embodiment, the entire supply unit can be placed on a motorized, plane rotating disc and, instead of gas springs, the solar panel can be moved to its swivelled position and held there by means of piston-cylinder units. If a GPS-System and suitable software is deployed for controlling the hydraulic pumps, which turn the rotating disc as well as actuate the piston-cylinder units, the optimal tracking of the supply unit at any place on earth, in accordance with the nature of the sunshine there, can be done. The solar panels then are always turned towards the sun and are held at the ideal inclination for the incident sunlight. FIG. 10 shows how the supply unit can be made to track the sun's position. It encloses a horizontal tubular ring 53, which stands on minimum three height adjustable props 55. It can then be leveled on a horizontal ground or can be anchored in a horizontal position on a base. The diameter of the tubular ring 53 corresponds with the diagonals between two of the four wheels 2 respectively on the device. The wheels 2 have a U-shaped running surface, on which they move reliably when they are placed on the tubular ring 53, so that the supply unit on the tubular ring 53 can be swivelled or rotated about its normal axis. At least one of the wheels 2 or better two wheels, which are opposite each other, are driven by an electric motor 56. The electronic control unit 69 is programmable logic controlled so that the supply unit, by means of the wheels drive, tracks the sun in accordance with the calendar dates and the time of the day.

This supply unit is extremely light in operation; moreover, it works maintenance-free and without emission. With its weight of approximately 300 kgs and its compact external dimensions of a cube of side length 1 m, it can be transported to any desired place without much problem, can be installed there and brought into operation. In places, where a strong wind blows, it is recommended that the supply unit is lashed down heavily on all sides when the solar panels are folded open.

Index of numbers
1. Box type profile frame
2. Wheels on the bottom side 1
3. Top side of profile frame 1
4. Box type profile frame on top of profile frame 1
5. Profile frame, peripherally connected to profile frame 4
6. Solar panels in profile frames 5
7. Central solar panel in profile frame 4
8. Horizontal swivelling axis for profile frame 4 with central solar panel
9. Slit between solar panel 7 and profile frame 4, running perpendicular to swivelling axis 8
10. Vertical pole
11. Wind mill
12. Blades of wind mill
13. Hub assembly for wind mill
14. Carrier rod for wind tail unit
15. Wind tail unit
16. Square frame (Top side frame 1)
17. Windmill's generator
18. Pipe segment with generator
19. Middle post for strengthening
20. Corner braces
21. Gas springs
22. Profiles for pole stabilizing
23. Hinges fro peripheral square profile frames 5
24. Box for water pump and filter
25. Box fro batteries and electronics
26. Box for wind mill and wind tail unit
27. Handgrips on boxes
28. Hooks
29. Flexible hose
30. Do
31. Coupling for hose 29
32. Coupling for hose 30
33. Stop cock for coupling 31
34. 34.Stop cock for coupling 32
35. Profile section for coupling 31
36. Profile section for coupling 32
37. Flats
38. Nuts on U-shaped tension rods
39. Profile for the module
40. Inner side of side wall of box 24
41. Pump
42. Electric motor
43. Power cable for electric motor of pump 41
44. High pressure hose from ceramic filter to pump
45. Valve for evacuation system
46. Brace elements
47. Pre-filtering device
48. Filter cartridge
49. Ceramic membrane filter device
50. Suction hose
51. Hose from pre-filter to pump
52. High pressure hose from pump to ceramic filter
53. Tubular ring as rail
54. Hose for receiving process water
55. Height adjustable props
56. Drive for wheels 2
60. Metal bands for securing generator
61. Strengthening profile
62. Rollers on frame box
63. Pipe clamp for securing pipe segment 18
64. Bar on pipe clamp 63
65. Socket for taking carrier rod 14
66. Electric cable from generator
67. Batteries
68. Inverter (Static converter)/Rectifier unit
69. Electrical control unit

The invention claimed is:

1. A supply unit for electric power and/or water derived from renewable energies, comprising;

a box type profile frame;

openable solar panels, forming a box, swivable into a plane of an upper side of the box so a cross-shaped arrangement of the solar panels is formed that may tilt about a horizontal axis on the profile frame;

wherein on its top side, as seen from above, a further square, box type frame is arranged, which contains a further solar panel and is connected to one top side of the box type profile frame so that the further solar panel may be swiveled about a horizontal axis;

wherein on all sides of the square-at-top frame are connected, in a swiveling way, respective peripheral square frames each of same size and each containing a solar panel, so that a cube is formed from the five square frames when the five square frames are swiveled downwards, and that the peripherally connected square frames may be swiveled in the plane of the central square frame and can be locked against the central square frame in the swiveled condition;

wherein the central square frame may be locked in each of its swiveled positions, and further, an openable vertical pole is arranged, on which a wind mill with blades, generator, and wind tail elements may be mounted and which may be similarly accommodated in the inside space of the box type profile frame; and wherein various modules, working as interfaces, are built in the inside of the box-type profile frame so that the supply unit offers in accordance with the varying need, a choice of at least one of:

accumulation of electrical energy from sunlight;

accumulation of electrical energy from a separate wind generator pumping water from stationary, flowing stretch of water or ground water;

treatment of drinking water through purification of supplied dirty water, delivery of electric power for different consumers; and direct current generation with hydrogen by means of fuel cells and vice versa hydrogen/oxygen production by splitting water with Direct Current.

2. The supply unit for electric power and/or water derived from renewable energies according to claim 1, wherein:

a base of the box type profile frame stands on wheels;

in the inside space of the box type profile frame, on whose one side the telescopic pole, built from several segments or an openable vertical pole is arranged, on which the windmill with the blades, the generator, and the wind tail elements may be mounted and which may be similarly accommodated in the inside space of the box type profile frame;

the box type profile frame has the plurality of box type modules, which may be inserted drawer like from one side and may be locked in the inserted position;

one of the modules contains at least an inverter/rectifier with a battery or a direct current-hydrogen generator with fuel cells and the electronic control unit for all the electronic components, one more of the electronic components containing the wind mill blades, the generator with wind hub, and the wind tail element, and one more contains a water pump and filtering device with connections for supply and delivery of water.

3. The supply unit for electric power and water derived from renewable energies according to claim 1, wherein:

a cube shaped box is formed when the swiveled down central, square solar panel frame, which is on the top side of the box type lower profile frame, and when the profile frame, which is connected to the former, is folded down at right angle to the same.

* * * * *